US012200660B2

(12) United States Patent
Behboodi et al.

(10) Patent No.: US 12,200,660 B2
(45) Date of Patent: Jan. 14, 2025

(54) UNSUPERVISED LEARNING FOR SIMULTANEOUS LOCALIZATION AND MAPPING IN DEEP NEURAL NETWORKS USING CHANNEL STATE INFORMATION

(71) Applicant: QUALCOMM Incorporated, San Diego, CA (US)

(72) Inventors: Arash Behboodi, Amsterdam (NL); Farhad Ghazvinian Zanjani, Almere (NL); Joseph Binamira Soriaga, San Diego, CA (US); Lorenzo Ferrari, Oakland, CA (US); Rana Ali Amjad, Amsterdam (NL); Max Welling, Bussum (NL); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/461,927

(22) Filed: Aug. 30, 2021

(65) Prior Publication Data
US 2022/0070822 A1 Mar. 3, 2022

Related U.S. Application Data

(60) Provisional application No. 63/072,821, filed on Aug. 31, 2020.

(51) Int. Cl.
*H04W 4/00* (2018.01)
*G06N 20/00* (2019.01)
*H04B 7/06* (2006.01)
*H04B 7/08* (2006.01)
*H04W 64/00* (2009.01)

(52) U.S. Cl.
CPC .......... *H04W 64/006* (2013.01); *G06N 20/00* (2019.01); *H04B 7/0626* (2013.01); *H04B 7/086* (2013.01)

(58) Field of Classification Search
CPC ... H04W 64/006; H04B 7/0626; H04B 7/086; G06N 3/044; G06N 3/045; G06N 3/048; G06N 3/084; G06N 3/088; G06N 20/00; G01S 5/0273; G01S 5/0278
See application file for complete search history.

(56) References Cited

U.S. PATENT DOCUMENTS

| 10,762,650 B1* | 9/2020 | Guo ......................... G06T 7/50 |
| 2004/0125013 A1* | 7/2004 | Haselsteiner ........... B60R 25/24 |
| | | 342/146 |

(Continued)

OTHER PUBLICATIONS

Partial International Search Report—PCT/US2021/048511—ISA/EPO—Mar. 18, 2022.

(Continued)

*Primary Examiner* — Edan Orgad
*Assistant Examiner* — Hidayat Dabiri
(74) *Attorney, Agent, or Firm* — QUALCOMM Incorporated

(57) ABSTRACT

A method of training an artificial neural network (ANN), receives, from a base station, signal information for a radio frequency signal between the base station and a user equipment (UE). The artificial neural network is trained to determine a location of the UE and to map the environment based on the received signal information and in the absence of labeled data.

19 Claims, 14 Drawing Sheets

(56) References Cited

U.S. PATENT DOCUMENTS

| | | | | |
|---|---|---|---|---|
| 2019/0051183 A1* | 2/2019 | Anderson | | G08G 1/163 |
| 2019/0188565 A1* | 6/2019 | O'Shea | | H04L 1/0001 |
| 2019/0362237 A1* | 11/2019 | Choi | | G06N 3/044 |
| 2020/0275402 A1 | 8/2020 | Shi et al. | | |
| 2021/0004677 A1* | 1/2021 | Menick | | G06N 20/20 |
| 2021/0150061 A1* | 5/2021 | Goodsitt | | G06F 21/6263 |
| 2021/0174209 A1* | 6/2021 | Zhuang | | G06F 16/2379 |
| 2021/0255634 A1* | 8/2021 | Mancilla | | H04W 4/023 |

OTHER PUBLICATIONS

International Search Report and Written Opinion—PCT/US2021/048511—ISA/EPO—May 11, 2022.

Gentner C., et al., "Multipath Assisted Positioning with Simultaneous Localization and Mapping", IEEE Transactions on Wireless Communications, vol. 15, No. 9, Sep. 2016, pp. 6104-6117.

Leitinger E., et al., "A Belief Propagation Algorithm for Multipath-Based SLAM", IEEE Transactions on Wireless Communications, vol. 18, Issue: 12, Dec. 2019, pp. 1-18.

* cited by examiner

Reflectors and anchors

Virtual anchors

UNSUPERVISED LEARNING FOR SIMULTANEOUS LOCALIZATION AND MAPPING IN DEEP NEURAL NETWORKS USING CHANNEL STATE INFORMATION

CROSS-REFERENCE TO RELATED APPLICATION

The present application claims the benefit of U.S. Provisional Patent Application No. 63/072,821, filed on Aug. 31, 2020, and titled "UNSUPERVISED LEARNING FOR SIMULTANEOUS LOCALIZATION AND MAPPING DEEP NEURAL NETWORKS USING CHANNEL STATE INFORMATION," the disclosure of which is expressly incorporated by reference in its entirety.

FIELD OF THE DISCLOSURE

Aspects of the present disclosure generally relate to wireless communications, and more particularly to techniques and apparatuses for unsupervised learning for simultaneous localization and mapping.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device.

These neural network architectures are used in various technologies, such as image recognition, pattern recognition, speech recognition, autonomous driving, and other classification tasks.

Localization and environment mapping are becoming a more essential part of next generation wireless networks and location-aware services and communication. As such, next generation wireless networks may utilize neural networks and machine learning processes, but such processes are data-driven. Unfortunately, most of the data for these tasks may be unlabeled therefore making training of such artificial neural networks difficult.

SUMMARY

The present disclosure is set forth in the independent claims, respectively. Some aspects of the disclosure are described in the dependent claims.

In aspects of the present disclosure, a method of localization and mapping using an artificial neural network (ANN) includes receiving, via the ANN, signal information from one or more base stations for radio frequency signals between the one or more base stations and a user equipment (UE). The method also includes determining a location of the UE based on the signal information.

In other aspects of the present disclosure, an apparatus for localization and mapping using an artificial neural network (ANN) includes a memory and one or more processors coupled to the memory. The processor(s) are configured to receive, via the ANN, signal information from one or more base stations for radio frequency signals between the one or more base stations and a user equipment. The processor(s) are also configured to determine a location of the UE based on the signal information.

In yet other aspects of the present disclosure, an apparatus for training an artificial neural network (ANN) includes means for receiving, via the ANN, signal information from one or more base stations for radio frequency signals between the one or more base stations and a user equipment. The apparatus also includes means for determining a location of the UE based on the signal information.

In aspects of the present disclosure, a non-transitory computer readable medium is provided. The computer readable medium has encoded thereon program code for training an artificial neural network (ANN). The program code is executed by a processor and includes code to receive, via the ANN, signal information from one or more base stations for radio frequency signals between the one or more base stations and a user equipment. The program code also includes code to train the ANN to determine a location of the UE based on the signal information.

In other aspects of the present disclosure, an artificial neural network is provided. The artificial neural network includes an encoder configured to determine a location of one or more user equipments (UEs). The artificial neural network also includes a decoder configured to parameterize a propagation environment of the one or more UEs. The encoder and the decoder are trained simultaneously using backpropagation.

In yet other aspects of the present disclosure, a method of operating an artificial neural network includes receiving transmissions of radio frequency (RF) signals from one or more reference nodes. The method also includes inferring from the RF signals or signal information derived from the RF signals. The location of a receiver of the RF signal transmissions is relative to the reference nodes.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 12 is a flow diagram illustrating an example process performed, for example, by a user equipment (UE), in accordance with various aspects of the present disclosure.

DETAILED DESCRIPTION

Figure 1:
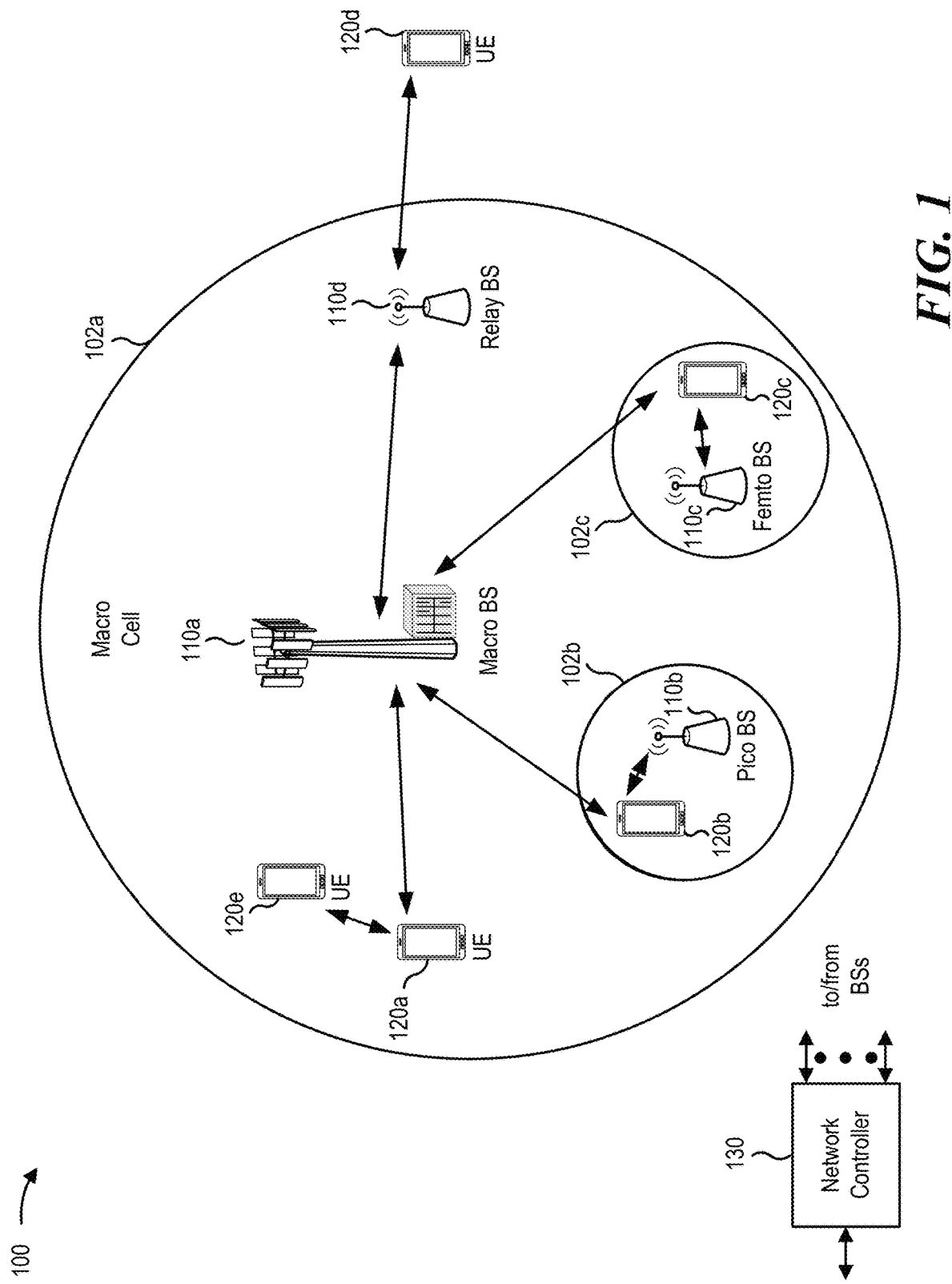
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Localization and environment mapping are becoming a more essential part of next generation wireless networks and location-aware services and communication. As such, next generation wireless networks may utilize neural networks and machine learning processes, but such processes are data-driven and computationally expensive. Additionally, training such neural networks is difficult.

Channel state information (CSI) reports of UEs are given in a data set from single or multiple base stations (e.g., gNBs) and may be useful for training neural networks for localization. The UE may perform CSI measurements based on signals, such as channel state information reference signals (CSI-RSs), received from the base station. The downlink CSI measurements are fed back from the UEs to the base station for processing.

The large amount of CSI feedback can be compressed with neural network processing, for example, with an auto-encoder at the UE. The UE can encode the channel state feedback and transmit the encoded feedback over the air to the base station. Upon receiving the information, the base station inputs the received encoded channel state feedback values into the decoder to approximate the channel state feedback.

The CSI elements may correspond to multiple subcarriers in multiple antennas. Unfortunately, CSI data is primarily unlabeled data (e.g., location is unknown) so training a neural network to leverage the CSI information is difficult.

In accordance with aspects of the present disclosure, neural network localization functions may be configured to map the CSIs or other signal information to locations. In some aspects, the neural network may be trained in an auto-encoding manner. An encoder part of the neural network may include a first network that provides a location. At the output of the encoder unit, the mapping unit may be added. The mapping unit may project all points inside the localization area and may provide for map awareness. A decoder part of the network may include a channel model that maps the position and environment parameters to a reconstruction of the CSIs. The channel model may be an analytical and differentiable model. As such, from the CSI values, mapping information (e.g., time of flight between a main anchor (e.g., base station) and a UE, and other times of flights corresponding to propagation effects (e.g., reflection, scattering) in the environment) may be derived such that the environment may be modeled based on the combination of the position of the main anchor and positions of a set of virtual anchors representing the propagation effects in the environment.

In some aspects, the decoder may be a generative model or a differentiable simulator, for example. If the position of radio frequency (RF) signal scatterers or reflectors is known, the position may be directly included in the model. Otherwise, the position may be added as a trainable parameter to the neural network. Accordingly, the network may be trained unsupervised end-to-end. Additionally, the neural network may simultaneously leverage multi-path techniques to aid in localization.

Furthermore, the localization information and environment map may be beneficial for communication optimization such as Internet-of-things (IoT) device discovery, interference management and improved handover processes.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB).

As indicated above, FIG. 1 is provided merely as an example. Other examples may differ from what is described with regard to FIG. 1.

Figure 2:
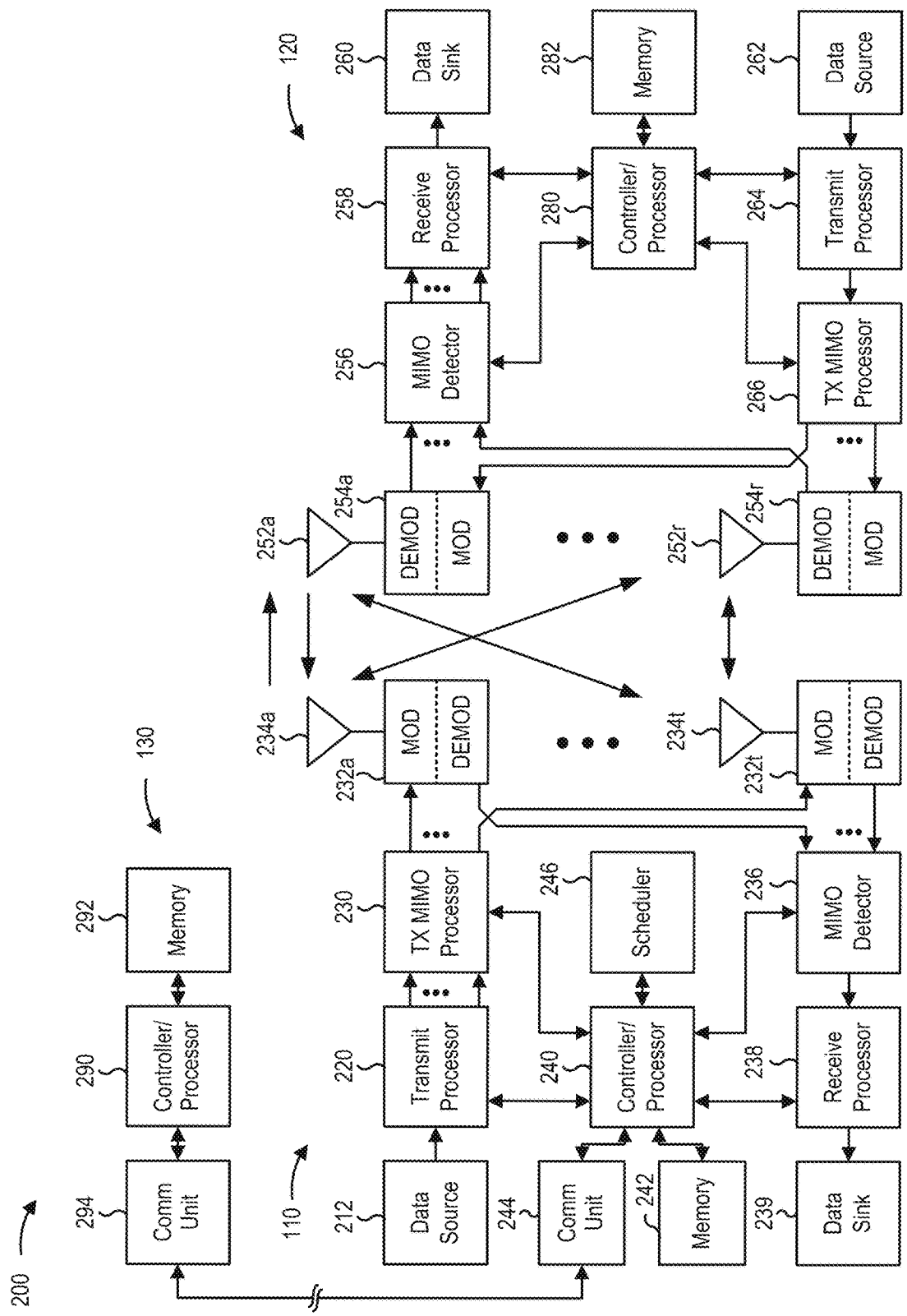
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 280 and/or receive processor 258 of the UE 120, the controller/processor 240 and/or the transmit processor 220 of the base station 110 and/or any other component(s) of FIG. 2 may perform one or more techniques associated with machine learning for localization and environment mapping, as described in more detail elsewhere. For example, the controller/processor 280 of the UE 120, and/or any other component(s) of FIG. 2 may perform or direct operations of, for example, the processes of FIGS. 10 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, from a base station, signal information for a radio frequency signal between a base station and a user equipment. The UE 120 may also include means for training an artificial neural network (ANN) to determine a location of the UE based on the signal information. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
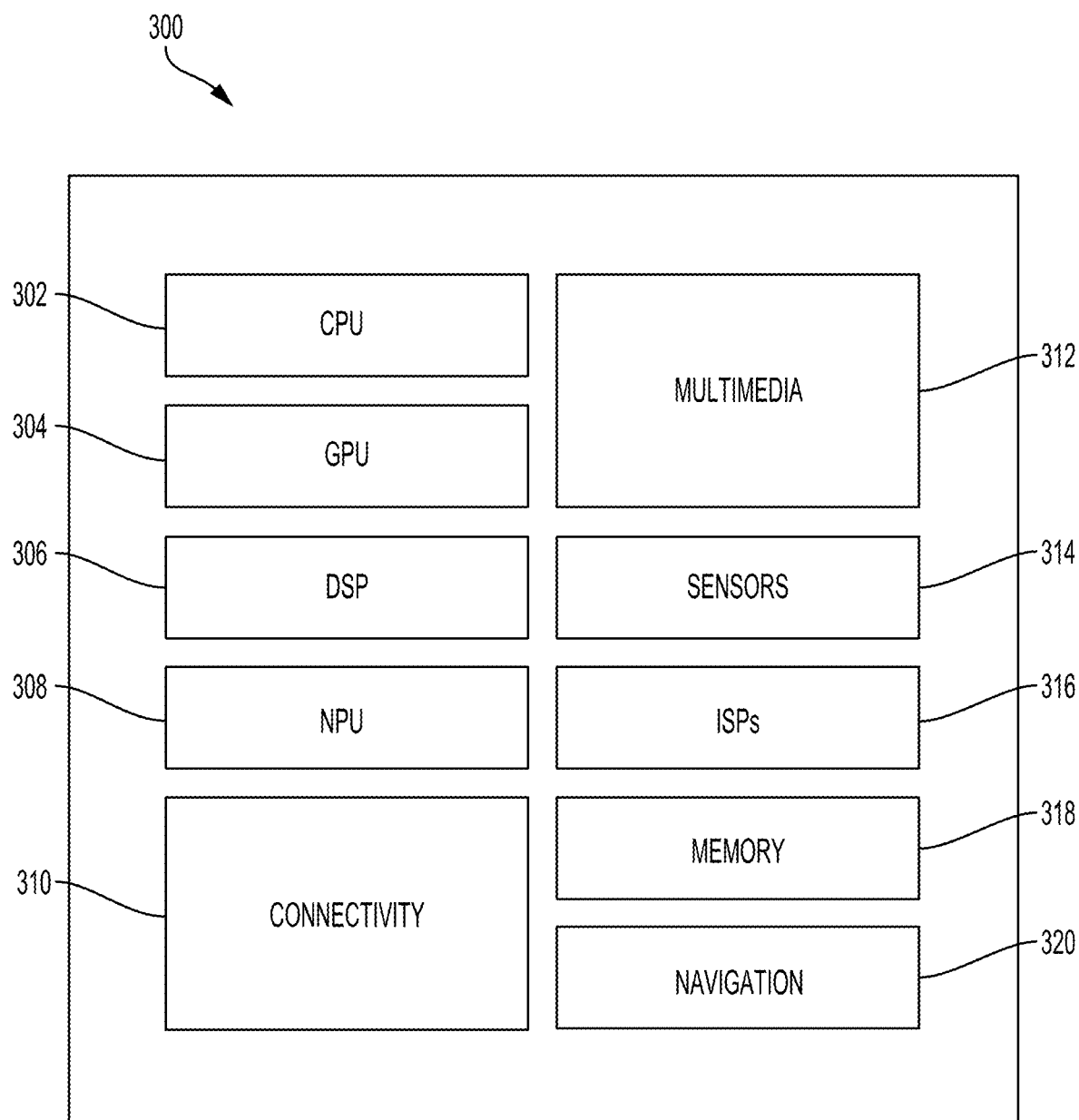
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for localization and mapping, in accordance with certain aspects of the present disclosure. The SOC 300 may be included in the UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, via an artificial neural network (ANN), signal information from one or more base stations for radio frequency signals between the one or more base stations and a user equipment. The instructions loaded into the general-purpose processor 302 may further comprise code to determine, via the ANN, a location of the UE based on the signal information.

The SOC 300 may be based on an ARM instruction set. In an aspect of the present disclosure, the instructions loaded into the general-purpose processor 302 may comprise code to receive, via a base station, signal information from one or more user equipments (UEs) for radio frequency signals between the one or more UEs and the base station. The instructions loaded into the general-purpose processor 302 may further comprise code to determine locations of the one or more UEs based on the signal information.

The SOC 300 may be based on an ARM instruction set. In an aspect of the present disclosure, the instructions loaded into the general-purpose processor 302 may comprise code to receive transmissions of radio frequency (RF) signals from one or more reference nodes. The instructions loaded into the general-purpose processor 302 may further comprise code to infer from the RF signals or signal information derived from the RF signals, a location of a receiver of the RF signal transmissions relative to the reference nodes.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data.

For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
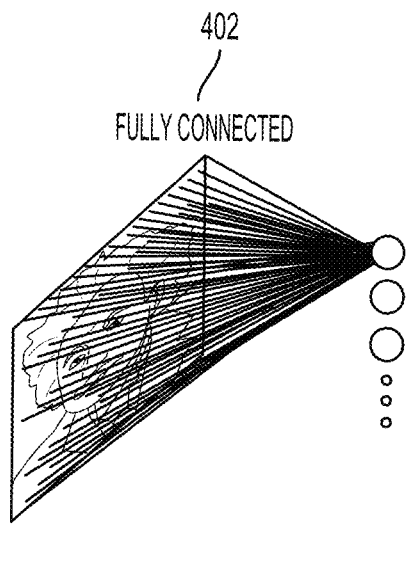
FIGS. 4A, 4B, and 4C are diagrams illustrating a neural network, in accordance with aspects of the present disclosure.
Figure 4B:
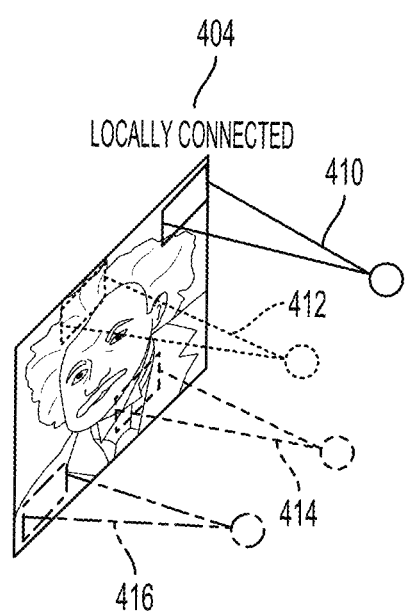

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
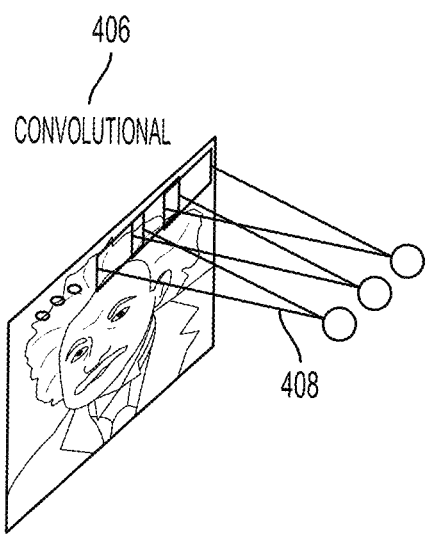

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
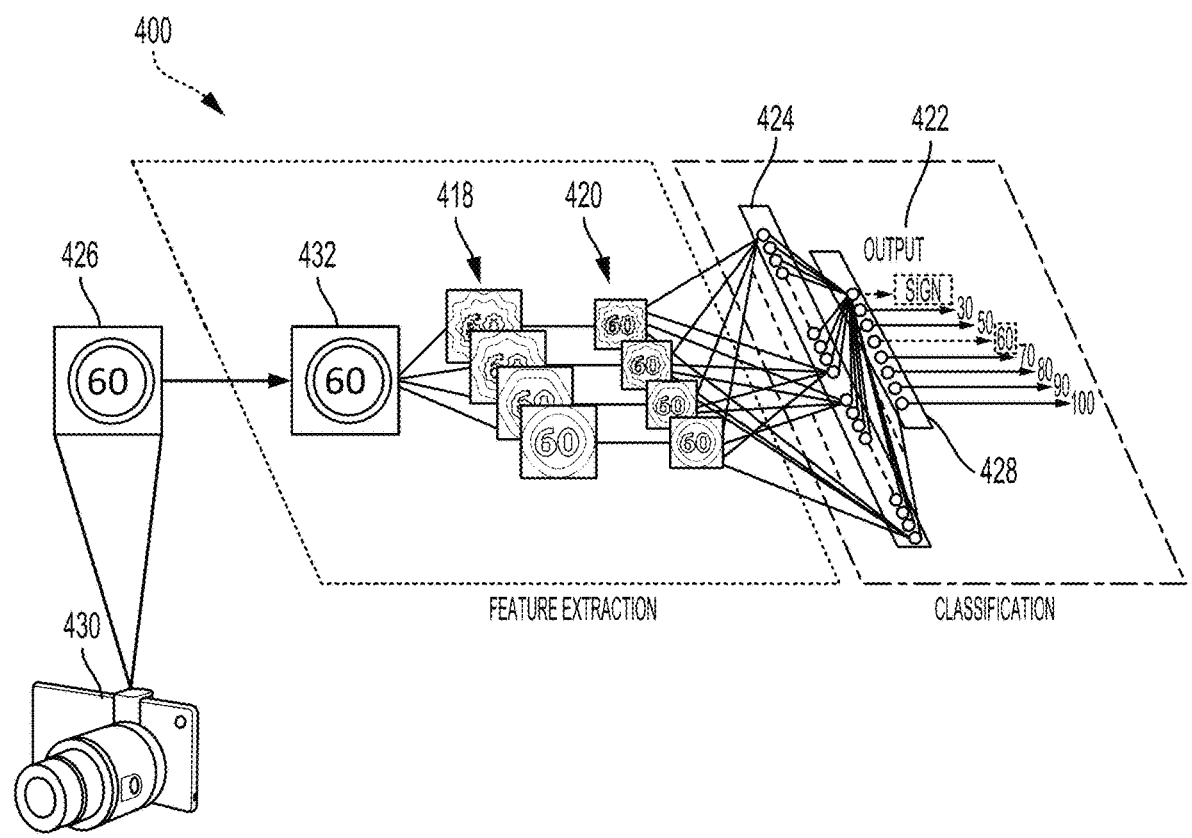
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
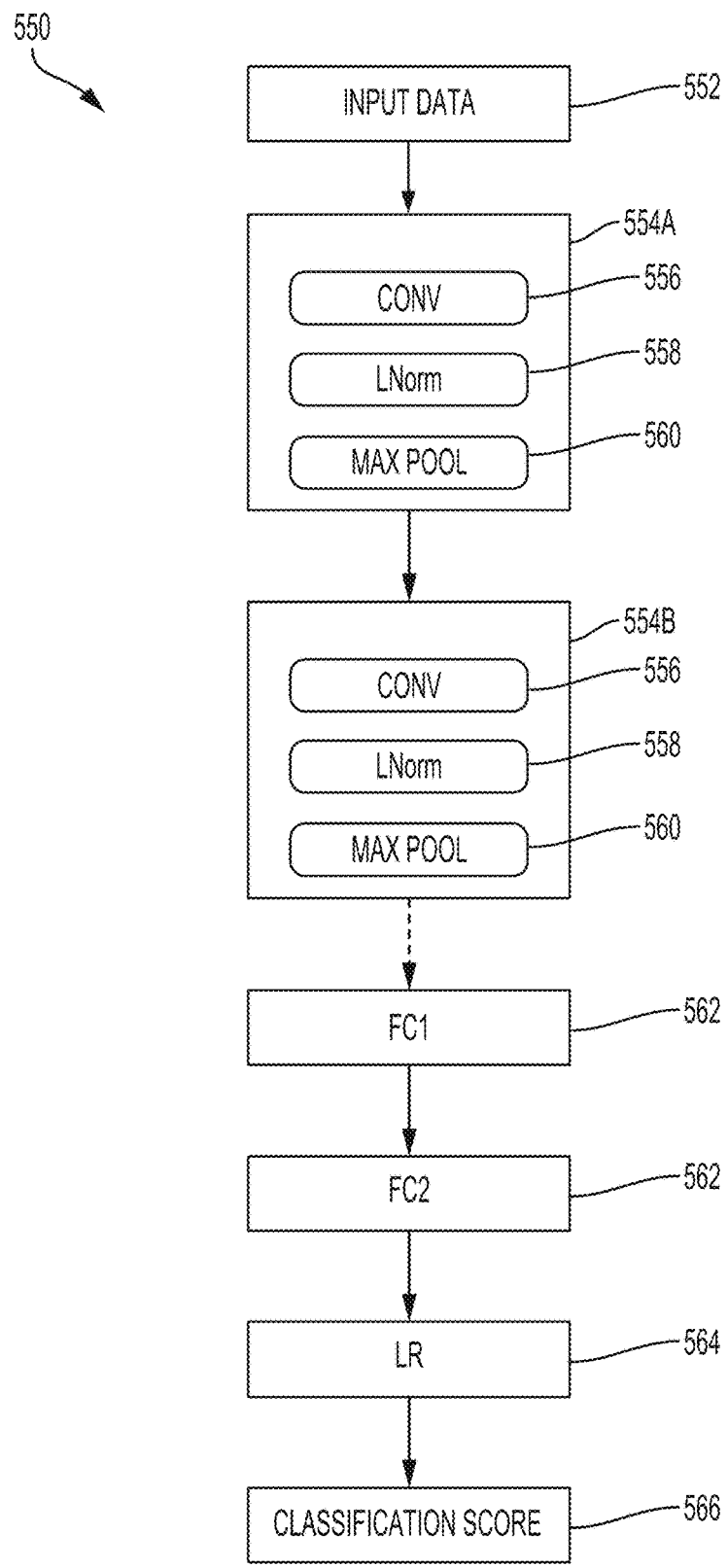
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

Figure 6A:
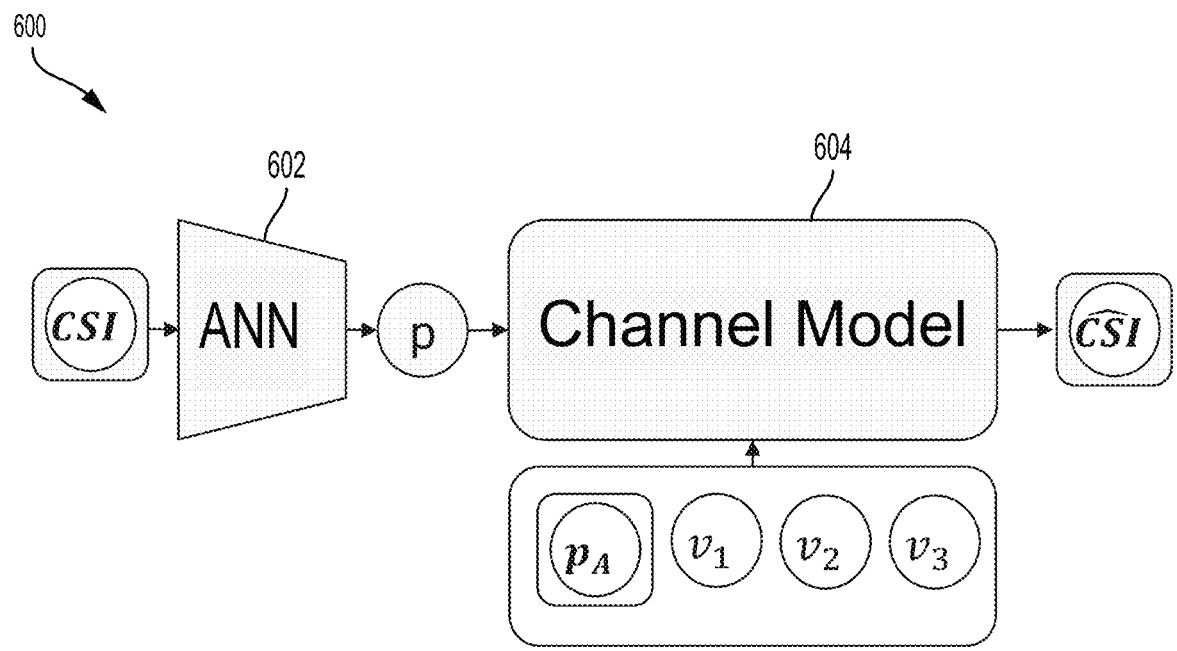
FIGS. 6A and 6B are block diagrams illustrating example architecture for training an artificial neural network for localization, in accordance with aspects of the present disclosure.

FIG. 6A is a block diagram illustrating an example architecture 600 for training an artificial neural network for localization, in accordance with aspects of the present disclosure. Referring to FIG. 6A, the architecture 600 may include an artificial neural network (ANN) 602 (which may be referred to as "neural network" (NN) 602) and a channel model 604. The ANN 602 may be a recurrent neural network, a long short-term memory, or other neural network, for example.

The ANN 602 may receive channel state information (CSI) as an input. Channel state information is information that characterizes radio frequency (RF) signal propagation over a channel, which may describe a communication link or path between a user equipment (UE) and one or more base stations (e.g., gNB). The channel state information may describe channel properties such as scattering, fading, and power decay of the signal over distance. UEs may perform CSI measurements based on signals, such as channel state information reference signals (CSI-RSs), received from each base station. The downlink CSI measurements may be fed back from the UEs to the base station for processing. The CSI measurements may be reported over N subcarriers and M antennas.

The ANN 602 may be configured as an auto-encoder to process the CSI, which may be substantially unlabeled or associated with unknown locations. The ANN 602 processes the CSI to infer location p for the UE. The location p may be given as a two-dimensional or three-dimensional location according to design preference, for example. The location p may be supplied to the channel model 604. The channel model 604 may model the propagation of radio frequency waves in the environment. The channel model 604 may be configured as an analytical and differentiable channel model, which maps the location p to CSI values according to:

$$\widehat{CSI} = f(p, p_A, \{v_i\}), \qquad (1)$$

where $p_A$ is the location of the base station (e.g., gNB) and $v_i$, i={1, ..., z} are learned environmental parameters. The location of the base station $p_A$ may be known and given. However, the present disclosure is not so limiting, and in some aspects, the channel model 604 may operate with an unknown base station location $p_A$. The channel model 604 may act as a decoder such that channel model 604 generates a reconstruction of the CSI values based on the location p supplied by the ANN 602. For example, the reconstructed CSI values may be a reconstruction of the CSI.

In some aspects, the environmental parameters $v_i$ may be jointly learned along with the parameters of the ANN 602 (e.g., weight values) by back propagating CSI values through the channel model 604. Of course, this is merely an example and not limiting, and the parameters of the ANN 602 and the parameters of the channel model may be learned separately. In some aspects, the environmental parameters may be learned based on a training loss, which may be computed as the mean square error (MSE) of the actual CSI values input to the ANN 602 and the computed CSI values (e.g., reconstruction of CSI values) output from the channel model 604 (e.g., MSE (CSI, $\widehat{CSI}$)). Because the process implemented via the architecture 600 is differentiable, the ANN 602 may be trained in an unsupervised manner (e.g., without labeled data).

Although the architecture 600 has been described using CSI, the present disclosure is not so limiting and other signal information or propagation information such as angle of arrival or time of flight may, for example, also be used for jointly learning object localization and environment mapping.

Figure 6B:
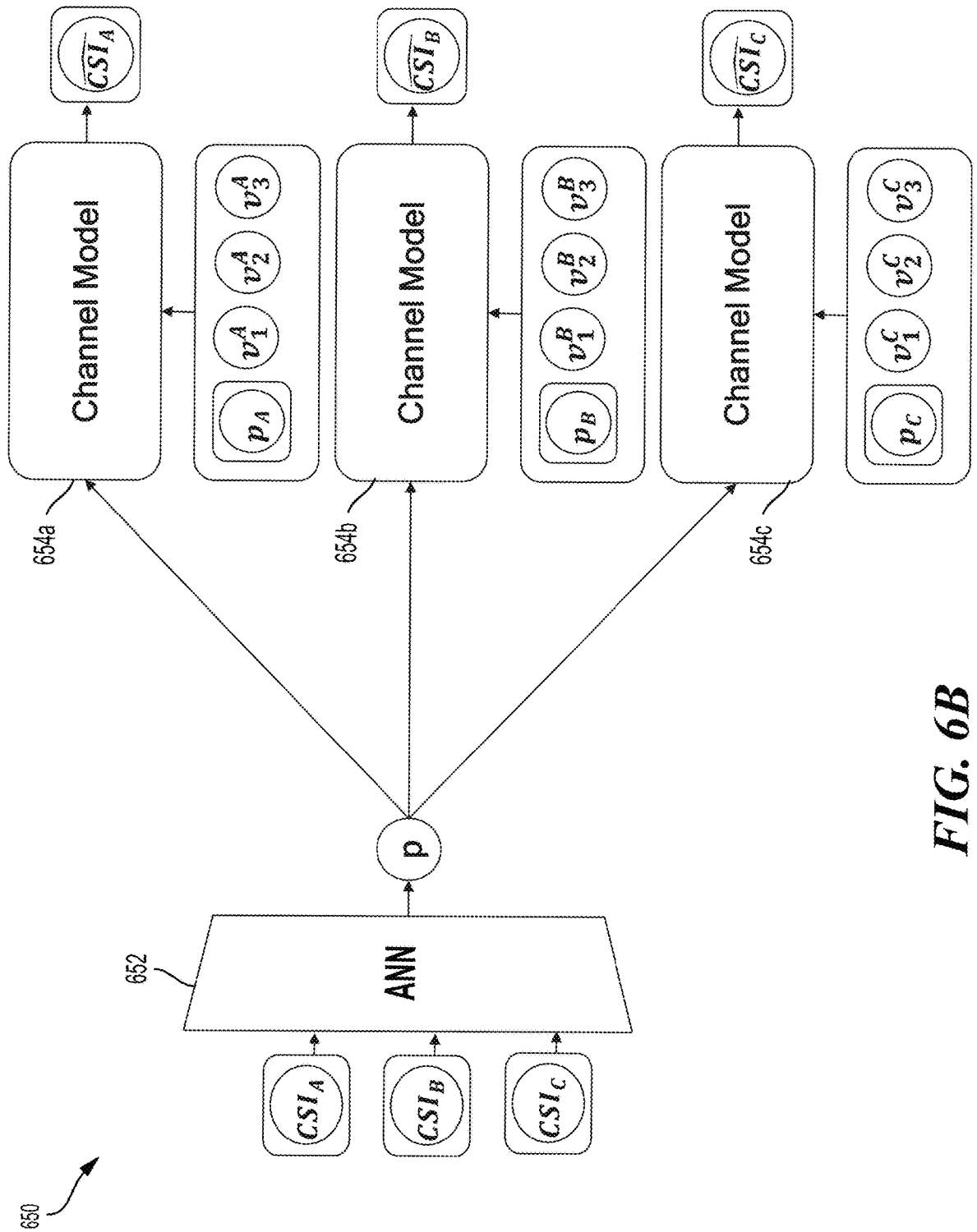

FIG. 6B is a block diagram illustrating an example architecture 650 for training an artificial neural network for localization, in accordance with aspects of the present disclosure. Referring to FIG. 6B, the example architecture 650, may include an artificial neural network (ANN) 652 and multiple channel models 654a-c. The ANN 652 may function as an encoder and may be trained to determine the location of a UE. The localization may be performed based on CSI values either received in the UE from one or multiple anchors (e.g., base stations) or received in one or multiple anchors from UEs. The training may be done on the anchor (e.g., base station) sides or on the UE side. If the training is performed on the base station, the training may be distributed or federated. For instance, the training information (e.g., training parameters) may be communicated to other nodes (e.g., base stations or UEs) which may leads to improved detectability and localization.

Each of the channel models 654a-c may be configured and function in a manner similar to that of channel model 604 of FIG. 6A. Each of the channel models 654a-c may receive the location p from the ANN 652. Each of the channel models 654a-c may serve as a decoder configured to parameterize the propagation environment. Each of channel models 654a-c may have its own set of learnable virtual anchors. The multiple channel models 654a-c may each generate a reconstruction of CSI values (e.g., $\widehat{CSI}_A$, $\widehat{CSI}_B$, $\widehat{CSI}_C$) from one of the anchors (where $p_A$, $p_B$, and $p_C$ are the location of the bases stations, respectively). In some aspects, the channel models 654a-c may operate as a single decoder with the channel models 654a-c as branches of the single decoder. The respective reconstructed CSI values may be concatenated and used to learn the environmental parameters jointly with parameters of the ANN 652 by backpropagation. The loss function may be the sum of these individual losses from each branch of the decoder (e.g., 654a-c).

Figure 7:
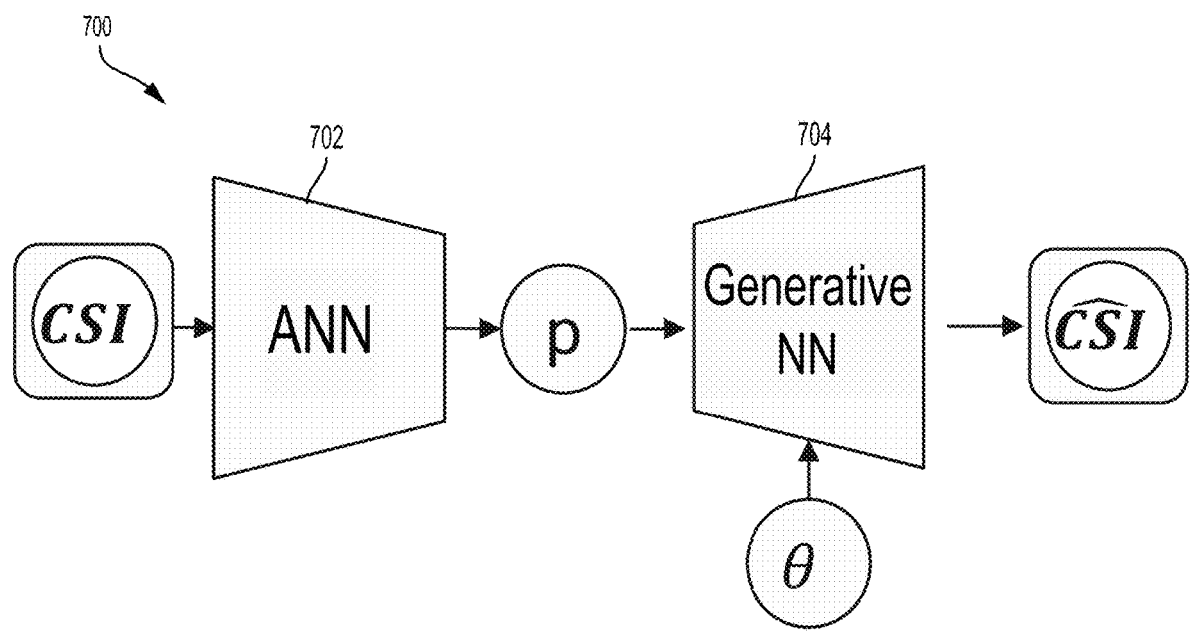
FIG. 7 is a block diagram of an example architecture for learning localization and mapping, in accordance with aspects of the present disclosure.

FIG. 7 is a block diagram of an example architecture 700 for learning localization and mapping, in accordance with aspects of the present disclosure. Referring to FIG. 7, the architecture 700, like the architecture 600 of FIG. 6A, includes an artificial neural network (ANN) 702, which receives channel state information as an input and infers a location p of a UE. However, the architecture 700 of FIG. 7 includes a generative neural network 704. Generative neural networks learn to map from a latent space to a data distribution of interest. Generative neural networks generate candidates for evaluation by a discriminative network. The generative neural network 704 maps the location p and environmental parameters θ to CSI values (e.g., candidates) as $\widehat{CSI} = f_{GN}(p, \theta)$. The generated CSI values (e.g., $\widehat{CSI}$) may be compared to the input CSI values to determine the training loss MSE (CSI, $\widehat{CSI}$). The generative neural network 704 may be trained offline and fixed during unsupervised training of the architecture 700. As such, the parameters of the ANN 702 (e.g., weight values) may be learned jointly with environmental parameters θ (e.g., a latent channel representation).

Figure 8:
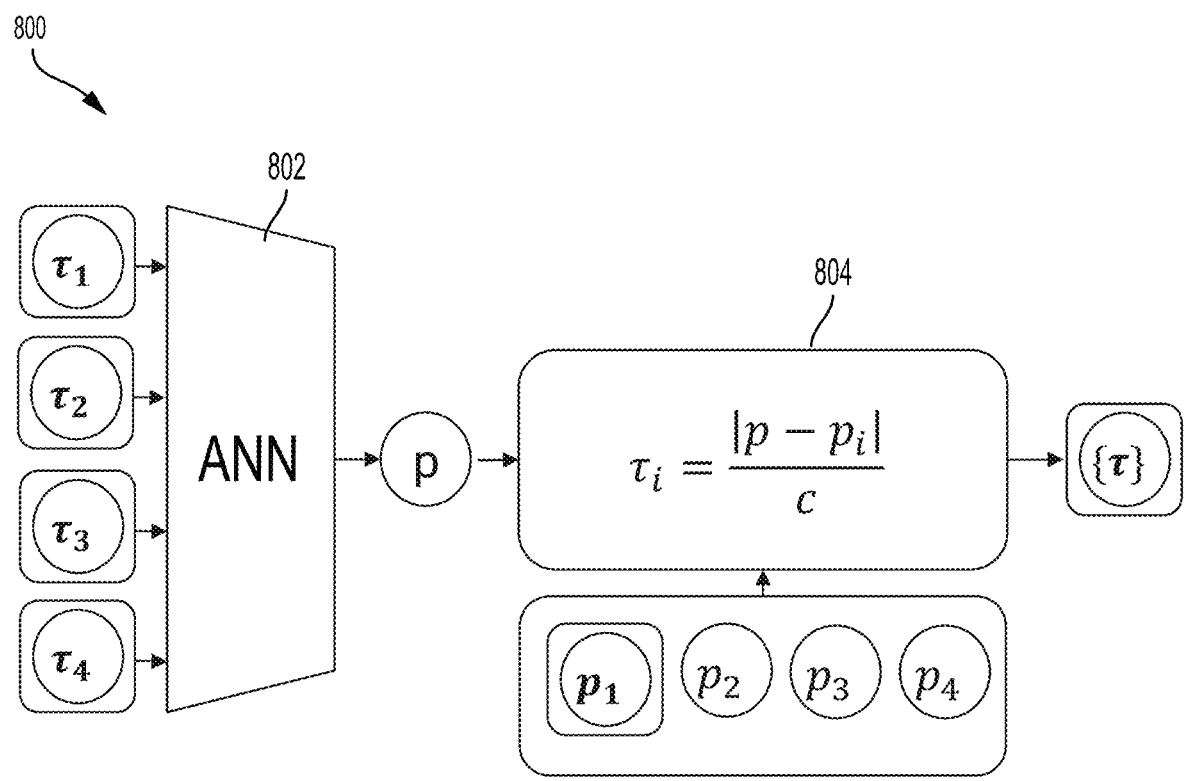
FIG. 8 is a block diagram of an example architecture for learning localization and mapping, in accordance with aspects of the present disclosure.

FIG. 8 is a block diagram of an example architecture 800 for learning localization and mapping, in accordance with aspects of the present disclosure. Referring to FIG. 8, the architecture 800 includes an artificial neural network (ANN) 802) and a decoder 804. The ANN 802 receives time of flight information $\tau_i$ corresponding to the time of flight of different paths of radio frequency (RF) wave propagation between a base station (e.g., gNB) and a user equipment (UE). The ANN 802 processes time of flight information to determine or infer a location p of the UE, which is supplied to the decoder 804.

The decoder 804 may be configured as a channel calculation unit, which seeks to recover the input time of flight information $\tau_i$. That is, the decoder 804 computes an estimate of the time of flight given by:

$$\hat{\tau}_i = \frac{|p - p_i|}{c}, \qquad (2)$$

where $p_1$ is the position of the base station (e.g., gNB), $p_2$, $p_3$, and $p_4$ are positions of virtual anchors, and c is the speed of light. The values of the virtual anchors $p_2$, $p_3$, and $p_4$ are unknown and may be learned simultaneously with the parameters of the ANN 802 (e.g., weight values) using back propagation.

Figure 9A:
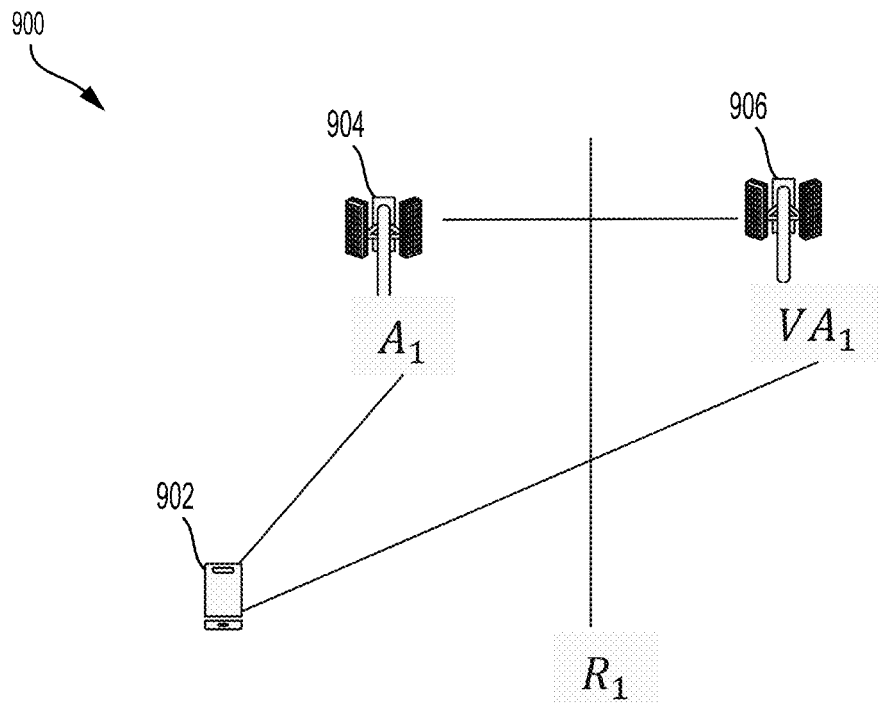
FIGS. 9A-C are diagrams illustrating an example parameterizing of a propagation environment, in accordance with aspects of the present disclosure.
Figure 9B:
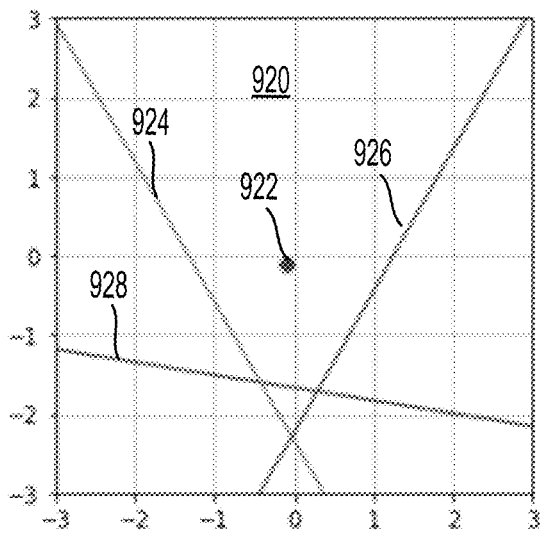
Figure 9C:
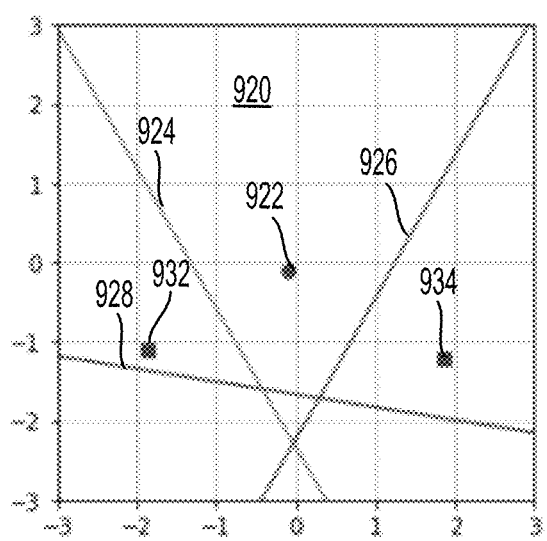

FIGS. 9A-C are diagrams illustrating an example parameterizing of a propagation environment 900. As shown in FIG. 9A, a UE 902 may be in communication with a base station $A_i$ 904 (e.g., gNB). An RF signal received at the UE 902 may also result from reflections of the RF signal off reflectors (e.g., R1) such as a wall or other scattering parameters (e.g., other objects or other obstruction in the RF signal path) in the surrounding environment. The reflected RF signal may be seen by the UE 902 as one or more virtual anchors $VA_j$ 906. The location of the virtual anchors $VA_j$ 906, alone or in conjunction with the location of the reflectors R1, may be used to model the environment.

Referring to FIG. 9B, an environment 920 includes a single anchor (e.g., a base station) 922 and three reflectors (924, 926, and 928), which reflect an RF signal from the single anchor 922 intended for a UE (not shown) in the environment 920. The reflections produced by each of the reflectors (924, 926, and 928) may be used to determine virtual anchors (not shown) for modeling the environment 920. Referring to FIG. 9C, the environment 920 including the reflectors 924, 926, and 928 may be modeled using the single anchor (e.g., a base station) 922 and virtual anchors 932 and 934. As such, the environment 920 may be parameterized using the anchor 922 and the locations of the virtual anchors 932 and 934. In some aspects, the location of the virtual anchors 932 and 934 may be learned simultaneously with learning parameters of the ANN for determining the location of the UE.

As indicated above, FIGS. 1-9C are provided as examples. Other examples may differ from what is described with respect to FIGS. 1-9C.

Figure 10:
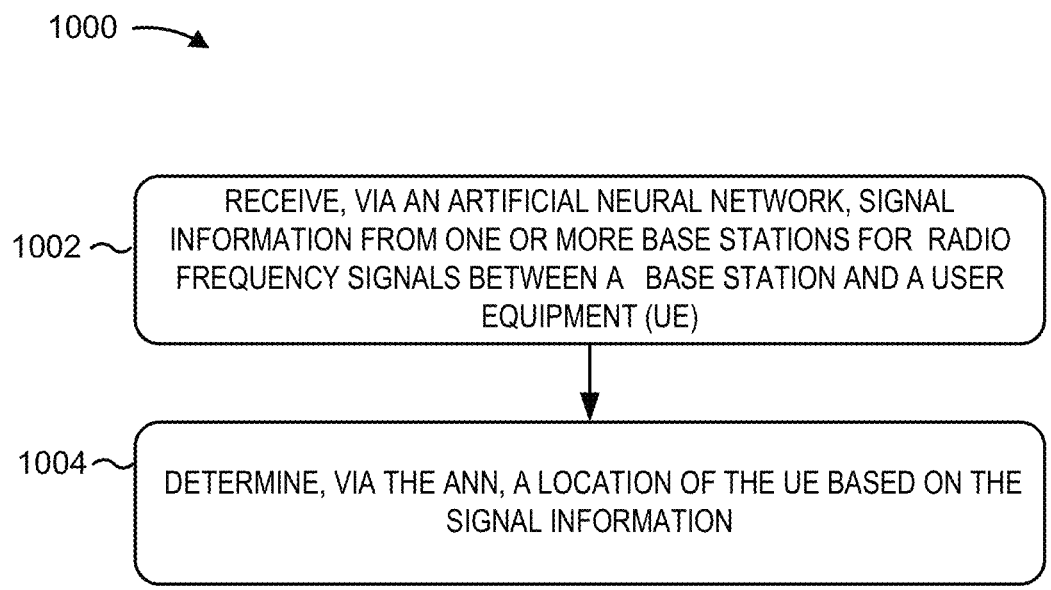
FIG. 10 is a flow diagram illustrating an example process performed, for example, by a user equipment (UE), in accordance with various aspects of the present disclosure.

FIG. 10 is a flow diagram illustrating an example process 1000 performed, for example, by a user equipment (UE), in accordance with various aspects of the present disclosure. The example process 1000 is an example of joint learning of localization and environment mapping. Referring to FIG. 10, at block 1002, the process 1000 receives, via an artificial neural network ANN, signal information from one or more base stations for radio frequency signals between the one or more base stations and a user equipment (UE). The signal information may include channel state information (e.g., CSI-RS), time of flight (ToF), or angle of arrival information (AoA), for example. As described with reference to FIG. 6A, an artificial neural network (ANN) 602 may receive channel state information as an input. Channel state information is information that describes radio frequency (RF) signal propagation over a channel, which may describe a communication link or path between the one or more base stations (e.g., gNB) and the user equipment (UE). The channel state information may describe channel properties such as scattering, fading, and power decay of the signal over distance. UEs may perform CSI measurements based on signals, such as channel state information reference signals (CSI-RSs), received from the base station. In some aspects, the base station may perform the CSI measurement.

At block 1004, the process determines, via the ANN, a location of the UE based on the signal information. The ANN may be trained using back propagation. As described with reference to FIG. 6A, The ANN 602 may be a recurrent neural network, a long short-term memory (LSTM), or other neural network, for example. The ANN 602 may be configured as an auto-encoder to process the CSI values, which may be substantially without labels or unknown locations. The ANN 602 processes the CSI values to infer location p for the UE. The location p may be given as a two-dimensional or three-dimensional location according to design preference, for example. The location p may be supplied to the channel model 604. The channel model 604 models the propagation of waves in the environment. The channel model 604 may act as a decoder such that channel model 604 generates CSI values based on the location p supplied by the ANN 602. The environmental parameters $v_i$ may be jointly learned along with the parameters of the ANN 602 (e.g., weight values) by back propagating CSI values through the channel model. The training loss is the mean square error of the actual CSI values input to the ANN 602 and the computed CSI values output from the channel model 604, MSE (CSI, $\widehat{CSI}$). Because the process implemented via the architecture 600 is differentiable, the ANN 602 may be trained in an unsupervised manner.

Figure 11:
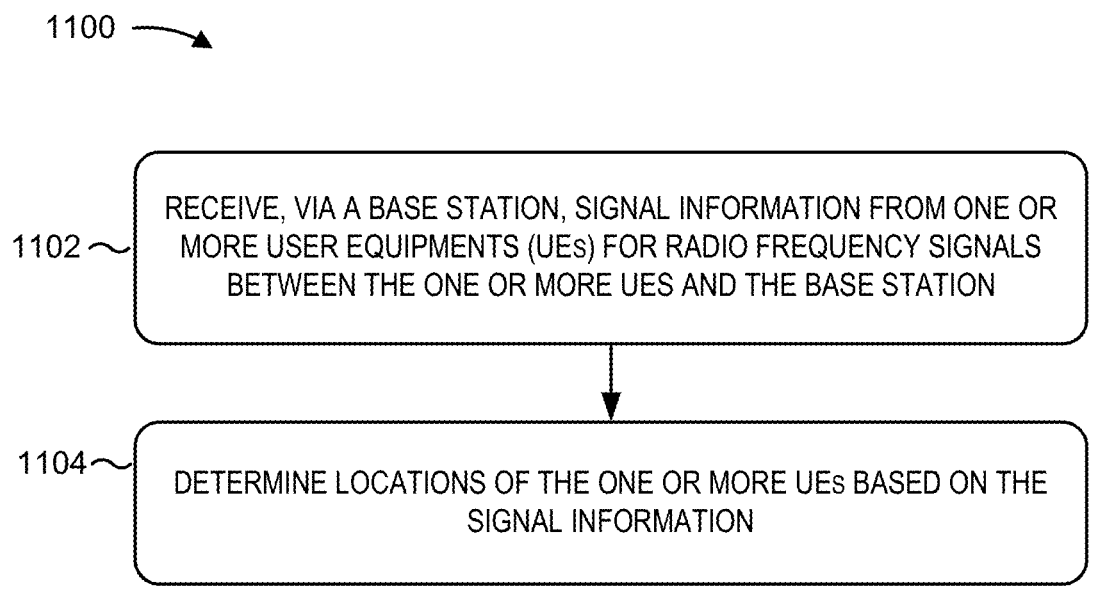
FIG. 11 is a flow diagram illustrating an example process performed, for example, by a base station, in accordance with various aspects of the present disclosure.
Figure 11:
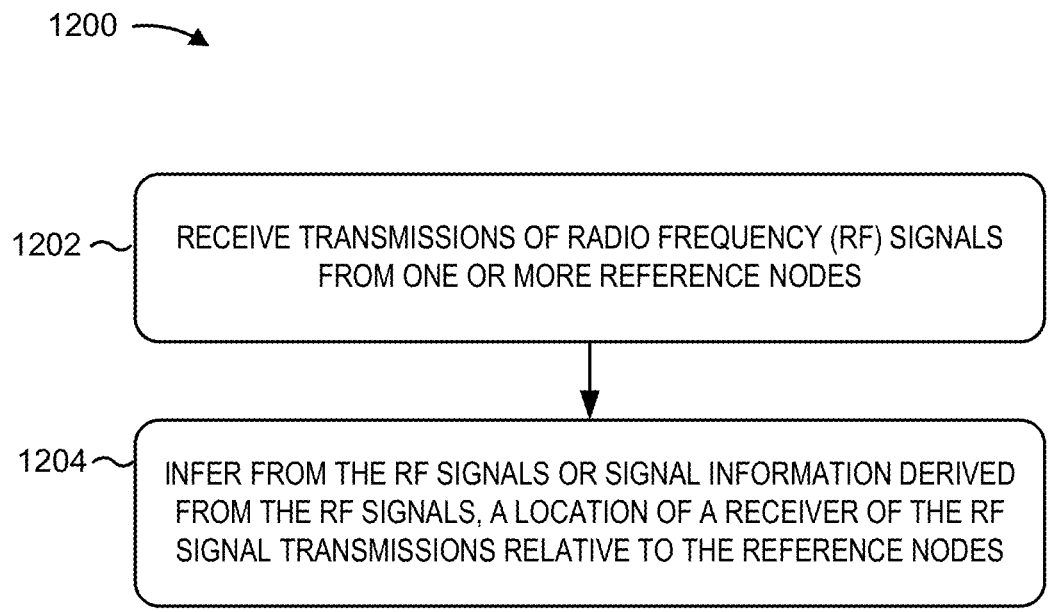

FIG. 11 is a flow diagram illustrating an example process 1100 performed, for example, by a base station, in accordance with various aspects of the present disclosure. The example process 1100 is an example of joint learning of localization and environment mapping. Referring to FIG. 11, at block 1102, the process 1100 receives, via a base station, signal information from one or more user equipments (UEs) for radio frequency signals between the one or more UEs and the base station. For instance, as described with reference to FIG. 6B, CSI values may be received in one or multiple anchors from one or more UEs.

At block 1104, the process 1100 determines locations of the one or more UEs based on the signal information. For example, as described with reference to FIG. 6B, an ANN 652 may function as an encoder and may be trained to determine the location of a UE. The localization may be performed based on CSI values either received in UE from one or multiple anchors (e.g., base stations) or received in one or multiple anchors from UEs. The training may be done on the anchor (e.g., base station) sides or on the UE side. In some aspects, the training may be distributed or federated. For instance, the training information (e.g., training parameters) may be communicated to other nodes (e.g., base stations or UEs) which may lead to improved detectability and localization.

FIG. 12 is a flow diagram illustrating an example process 1200 performed, for example, by a UE, in accordance with various aspects of the present disclosure. Referring to FIG. 12, at block 1202, the process 1200 receives transmissions of radio frequency (RF) signals from one or more reference nodes. As described, for example with reference to FIG. 6A, the ANN 602 may receive channel state information (CSI) as an input. Channel state information is information that characterizes radio frequency (RF) signal propagation over a channel, which may describe a communication link or path between a user equipment (UE) and one or more base stations (e.g., gNB). The channel state information may describe channel properties such as scattering, fading, and power decay of the signal over distance. UEs may perform CSI measurements based on signals, such as channel state information reference signals (CSI-RSs), received from each base station. The downlink CSI measurements may be fed back from the UEs to the base station for processing. The CSI measurements may be reported over N subcarriers and M antennas.

At block 1204, the process 1200 infers from the RF signals or signal information derived from the RF signals, a location of a receiver of the RF signal transmissions relative to the reference nodes. For example, as described with reference to FIG. 6A, the ANN 602 processes the CSI to infer location p for the UE. The location p may be given as a two-dimensional or three-dimensional location according to design preference, for example.

In some aspects, a decoder may receive the location information for the one or more UEs. The decoder, generate a reconstruction of signal information for radio frequency signals between one or more base stations and the UE. The decoder may, for example, be a channel propagation model. Additionally, in some aspects, a mapping of the environment of the UE may be determined based on the position information and the reconstructed signal information.

Implementation examples are provided in the following numbered clauses:

1. A method of localization and mapping using an artificial neural network (ANN), comprising:
    receiving, via the ANN, signal information from one or more base stations for radio frequency signals between the one or more base stations and a user equipment (UE); and
    determining, via the ANN, a location of the UE based on the signal information.
2. The method of clause 1, in which the signal information is channel state information, a time of flight or an angle of arrival.
3. The method of clause 1 or 2, further comprising training the ANN using back propagation.
4. The method of any of clauses 1-3, further comprising decoding the location of the UE to determine an estimate of the signal information.
5. The method of any of clauses 1-4, in which the signal information is unlabeled data.
6 The method of any of clauses 1-5, further comprising:
    determining one or more virtual anchors based on reflections of the radio frequency signals; and
    jointly learning a position of the one or more virtual anchors and parameters of the ANN.
7. A method of localization and mapping using an artificial neural network (ANN), comprising:
    receiving, via a base station, signal information from one or more user equipments (UEs) for radio frequency signals between the one or more UEs and the base station; and
    determining locations of the one or more UEs based on the signal information.
8. The method of clause 7, in which the signal information is channel state information, a time of flight or an angle of arrival.
9. The method of clause 7 or 8, further comprising training the ANN using back propagation.
10. The method of any of clauses 7-9, further comprising decoding the locations of the one or more UEs to determine an estimate of the signal information.
11. The method of any of clauses 7-10, in which the signal information is unlabeled data.
12. The method of any of clauses 7-11, further comprising:
    determining one or more virtual anchors based on reflections of the radio frequency signals; and
    jointly learning a position of the one or more virtual anchors and parameters of the ANN.
13. An artificial neural network comprising:
    an encoder configured to determine a location of one or more user equipments (UEs) based on signal information from the one or more UEs for radio frequency signals between the one or more UEs and a base station;
    a decoder configured to parameterize a propagation environment of the one or more UEs based at least in part on the location of the one or more UEs.
14. The artificial neural network of clause 13, in which the encoder comprises a second artificial neural network and the decoder includes a channel model.
15. The artificial neural network of clause 13 or 14, in which the channel model comprises a function of learnable environment parameters.
16. The artificial neural network of any of clauses 13-15, in which the learnable environment parameters comprise locations of one or more virtual nodes representing signal propagation effects associated with the radio frequency signals between the one or more UEs and the base station.
17. The artificial neural network of any of clauses 13-16, in which the channel model comprises a generative artificial neural network.
18. The artificial neural network of any of clauses 13-17, in which the encoder and the decoder are trained simultaneously using backpropagation.
19. A method of operating an artificial neural network (ANN), comprising:
    receiving transmissions of radio frequency (RF) signals from one or more reference nodes; and
    inferring from the RF signals or signal information derived from the RF signals, a location of a receiver of the RF signal transmissions relative to the one or more reference nodes.
20. The method of clause 19, in which the ANN includes learnable parameters for one or more virtual node locations, the one or more virtual node locations corresponding to reflected signal transmissions from the one or more reference nodes received by the receiver.
21. The method of clause 19 or 20, further comprising generating a mapping of an environment of the receiver of the RF signal transmission based on the location of the receiver and the learnable parameters for the one or more virtual node locations.
22. The method of any of clauses 19-21, in which the learnable parameters for the one or more virtual node locations represent propagation effects associated with the RF signals.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of localization and mapping using an artificial neural network (ANN), comprising:
   receiving, by the ANN, input signal information from one or more base stations for radio frequency signals between the one or more base stations and a user equipment (UE) in an environment;
   determining, by the ANN, a location of the UE based on the input signal information; and
   decoding, with a channel model, the location of the UE to generate reconstructed signal information based on a set of learned environment parameters corresponding to propagation effects in the environment and the location information determined by the ANN, the propagation effects including one or more of reflections or scattering of the radio frequency signals, the learned environment parameters based on a training loss computed from a difference between the input signal information and the reconstructed signal information the learned environment parameters being input to the channel model.

2. The method of claim 1, in which the input signal information is channel state information, a time of flight or an angle of arrival.

3. The method of claim 1, further comprising training the ANN using back propagation.

4. The method of claim 1, in which the input signal information is unlabeled data.

5. The method of claim 1, further comprising:
   determining one or more virtual anchors based on the reflections of the radio frequency signals; and
   jointly learning a position of the one or more virtual anchors and parameters of the ANN.

6. A method of localization and mapping using an artificial neural network (ANN), comprising:
   receiving, via a base station, input signal information from one or more user equipments (UEs) for radio frequency signals between the one or more UEs and the base station in an environment;
   determining locations of the one or more UEs based on the input signal information; and
   decoding, with a channel model, the locations of the one or more UEs to generate reconstructed signal information based on a set of learned environment parameters corresponding to propagation effects in the environment and the determined locations of the one or more UEs, the propagation effects including one or more of reflections or scattering of the radio frequency signals, the learned environment parameters based on a training loss computed from a difference between the input signal information and the reconstructed signal information the learned environment parameters being input to the channel model.

7. The method of claim 6, in which the input signal information is channel state information, a time of flight or an angle of arrival.

8. The method of claim 6, further comprising training the ANN using back propagation.

9. The method of claim 6, in which the input signal information is unlabeled data.

10. The method of claim 6, further comprising:
    determining one or more virtual anchors based on the reflections of the radio frequency signals; and
    jointly learning a position of the one or more virtual anchors and parameters of the ANN.

11. An artificial neural network comprising:
    an encoder configured to determine a location of one or more user equipments (UEs) based on input signal information from the one or more UEs for radio frequency signals between the one or more UEs and a base station in an environment; and
    a decoder, comprising a channel model and configured to parameterize the environment of the one or more UEs and generate reconstructed signal information based at least in part on the location of the one or more UEs and a set of learned environment parameters corresponding to propagation effects in the environment for mapping the input signal information to location information, the propagation effects including one or more of reflections or scattering of the radio frequency signals, the learned environment parameters based on a training loss computed from a difference between the input signal information and the reconstructed signal information the learned environment parameters being input to the channel model.

12. The artificial neural network of claim 11, in which the encoder comprises a second artificial neural network and the decoder includes the channel model.

13. The artificial neural network of claim 12, in which the channel model comprises a function of the set of learned environment parameters.

14. The artificial neural network of claim 13, in which the set of learned environment parameters comprise locations of one or more virtual nodes representing signal propagation effects associated with the radio frequency signals between the one or more UEs and the base station.

15. The artificial neural network of claim 12, in which the channel model comprises a generative artificial neural network.

16. The artificial neural network of claim 12, in which the encoder and the decoder are trained simultaneously using backpropagation.

17. A method of operating an artificial neural network (ANN), comprising:
    receiving transmissions of radio frequency (RF) signals from one or more reference nodes in an environment;

inferring from the RF signals or input signal information derived from the RF signals, a location of a receiver of the RF signal transmissions relative to the one or more reference nodes; and decoding, with a channel model, the location of the receiver to generate reconstructed signal information based on a set of learned environment parameters corresponding to propagation effects in the environment for mapping the input signal information to location information, the propagation effects including one or more of reflections or scattering of the RF signals, the learned environment parameters based on a training loss computed from a difference between the input signal information and the reconstructed signal information, the learned environment parameters being input to the channel model.

18. The method of claim 17, in which the learned environment parameters are associated with one or more virtual node locations, the one or more virtual node locations corresponding to reflected signal transmissions from the one or more reference nodes received by the receiver.

19. The method of claim 18, further comprising generating a mapping of the environment of the receiver of the RF signal transmission based on the location of the receiver and the learned environment parameters associated with the one or more virtual node locations.

* * * * *